(12) United States Patent
Whalen et al.

(10) Patent No.: US 8,561,551 B2
(45) Date of Patent: *Oct. 22, 2013

(54) TELEVISION SUPPORT AND MOUNTING KIT

(71) Applicant: Whalen Furniture Manufacturing Inc., San Diego, CA (US)

(72) Inventors: Kenneth Whalen, San Diego, CA (US); Paul R. Jones, San Marcos, CA (US)

(73) Assignee: Whalen Furniture Manufacturing, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/833,501

(22) Filed: Mar. 15, 2013

(65) Prior Publication Data

US 2013/0206711 A1 Aug. 15, 2013

Related U.S. Application Data

(63) Continuation-in-part of application No. 13/487,459, filed on Jun. 4, 2012, which is a continuation of application No. 13/316,792, filed on Dec. 12, 2011, now Pat. No. 8,191,485, which is a continuation of application No. 11/860,271, filed on Sep. 24, 2007, now Pat. No. 8,079,311, which is a continuation-in-part of application No. 11/890,828, filed on Aug. 8, 2007, now abandoned, application No. 13/833,501, filed on Mar. 15, 2013, which is a continuation-in-part of application No. 12/417,902, filed on Apr. 3, 2009, which is a continuation of application No. 11/135,888, filed on May 24, 2005, now Pat. No. 7,530,538.

(51) Int. Cl.
*A47B 23/00* (2006.01)

(52) U.S. Cl.
USPC ....... 108/42; 248/923; 248/125.8; 108/50.01; 108/50.11; D6/479; D6/474

(58) Field of Classification Search
USPC ........ 108/42, 50.01, 50.02, 50.11, 10, 23, 91, 108/92, 96; 312/223.6, 223.1, 223.3; 248/923, 125.8, 150, 176.1, 917, 149, 248/154, 157, 161, 178.1, 176.3, 132, 920, 248/333, 327, 220.21, 274.1, 200; D6/479, D6/474, 477

See application file for complete search history.

(56) References Cited

U.S. PATENT DOCUMENTS

| 366,525 A | 7/1887 | Taliaferro |
| 368,388 A | 8/1887 | Drake |

(Continued)

FOREIGN PATENT DOCUMENTS

| JP | 2006060754 | 3/2006 |
| WO | 2009143771 | 3/2009 |

OTHER PUBLICATIONS

Furniture Today article entitled, "Special Report: New TV Formats", Apr. 28, 2003, pp. 1-2.

(Continued)

*Primary Examiner* — Jose V Chen
(74) *Attorney, Agent, or Firm* — Barlow, Josephs & Holmes, Ltd.

(57) ABSTRACT

A panel television support and mounting kit allows the consumer to employ any of the three modes of support, namely stand mount, elevated console mount and wall mount. The elevated console mount incorporates a vertical spine to elevate the panel television above the console and an offset arm to support the television over an upper shelf of the console. A mounting structure is provided that can be attached to the spine or to a wall.

21 Claims, 17 Drawing Sheets

(56) References Cited

U.S. PATENT DOCUMENTS

| | | | |
|---|---|---|---|
| 866,522 | A | 9/1907 | Scanlon |
| 1,324,537 | A | 12/1919 | Belcher |
| 1,398,601 | A | 11/1921 | Osterhout |
| 1,590,726 | A | 6/1926 | Corsgren |
| 1,598,569 | A | 8/1926 | Fitzhugh |
| 1,692,337 | A | 11/1928 | Forbes |
| 1,797,847 | A | 3/1931 | Vandagriff |
| 2,193,647 | A | 3/1940 | Rush |
| 2,359,895 | A | 10/1944 | Burton |
| D141,593 | S | 6/1945 | Doty |
| 2,535,112 | A | 12/1950 | Woody |
| 2,605,155 | A | 7/1952 | Lewis |
| 3,232,249 | A | 2/1966 | Perez |
| 3,358,957 | A | 12/1967 | Lindenmuth |
| 3,875,356 | A | 4/1975 | Heim et al. |
| 3,905,573 | A | 9/1975 | Davis |
| 4,020,510 | A | 5/1977 | Fabian |
| 4,076,203 | A | 2/1978 | McDonnell |
| 4,272,136 | A | 6/1981 | Sengua |
| 4,410,158 | A | 10/1983 | Maffei |
| 4,444,323 | A | 4/1984 | Travis |
| 4,993,676 | A | 2/1991 | Fitts |
| 5,139,223 | A | 8/1992 | Sedighzadeh |
| 5,207,405 | A | 5/1993 | Cobb |
| 5,282,427 | A | 2/1994 | Steinhilber |
| 5,549,264 | A | 8/1996 | West |
| 6,158,701 | A | 12/2000 | Deshler |
| 6,288,891 | B1 | 9/2001 | Hasegawa |
| 6,327,982 | B1 | 12/2001 | Jackson |
| 6,347,433 | B1 | 2/2002 | Novin |
| D454,731 | S | 3/2002 | Niitsu |
| D458,053 | S | 6/2002 | Luong |
| 6,425,631 | B1 | 7/2002 | Lin |
| 6,609,691 | B2 | 8/2003 | Oddsen |
| D480,237 | S | 10/2003 | deCarolis |
| 6,672,465 | B2 | 1/2004 | White |
| 6,695,270 | B1 | 2/2004 | Smed |
| 6,699,146 | B1 | 3/2004 | Winter |
| 6,704,193 | B2 | 3/2004 | Vathulya |
| 6,758,454 | B2 | 7/2004 | Smed |
| D495,163 | S | 8/2004 | Weatherly |
| 6,796,536 | B1 | 9/2004 | Sevier |
| 6,905,101 | B1 | 6/2005 | Dittmer |
| D507,900 | S | 8/2005 | Sexton, III |
| D508,801 | S | 8/2005 | Holst |
| 6,923,413 | B2 | 8/2005 | Dozier |
| D517,349 | S | 3/2006 | Lara |
| D524,080 | S | 7/2006 | Stenhouse |
| 7,082,882 | B2 | 8/2006 | Heimbrock |
| 7,118,080 | B2 | 10/2006 | Chan |
| D531,428 | S | 11/2006 | Choo |
| 7,175,146 | B2 | 2/2007 | Kim |
| 7,178,775 | B2 | 2/2007 | Pfister |
| D537,268 | S | 3/2007 | Tung |
| D539,125 | S | 3/2007 | Ly Hau |
| 7,195,213 | B2 | 3/2007 | Weatherly |
| D539,565 | S | 4/2007 | Sexton, III |
| D541,138 | S | 4/2007 | Whalen |
| 7,261,261 | B2 | 8/2007 | Ligertwood |
| D564,261 | S | 3/2008 | Sculler |
| D565,054 | S | 3/2008 | Anderson |
| D566,426 | S | 4/2008 | Stenhouse |
| D567,545 | S * | 4/2008 | Liu .................. D6/479 |
| D567,546 | S | 4/2008 | Liu |
| D570,620 | S | 6/2008 | Ongor |
| D574,698 | S | 8/2008 | Grey |
| 7,424,991 | B2 * | 9/2008 | Kim et al. .................. 248/125.9 |
| 7,530,538 | B2 | 5/2009 | Whalen |
| D593,776 | S * | 6/2009 | Sexton .................. D6/478 |
| D595,978 | S | 7/2009 | Portnoy |
| D604,962 | S | 12/2009 | Daud |
| D607,671 | S | 1/2010 | Sexton, III |
| D609,942 | S * | 2/2010 | Sexton .................. D6/477 |
| 8,079,311 | B2 * | 12/2011 | Whalen et al. .................. 108/42 |
| 8,191,485 | B1 * | 6/2012 | Whalen et al. .................. 108/42 |
| 2002/0011544 | A1 | 1/2002 | Bosson |
| 2004/0011932 | A1 | 1/2004 | Duff |
| 2004/0031897 | A1 | 2/2004 | Holland |
| 2004/0041062 | A1 | 3/2004 | Ozolins |
| 2004/0079849 | A1 | 4/2004 | Rudolf |
| 2004/0079858 | A1 | 4/2004 | Rudolf |
| 2004/0084578 | A1 | 5/2004 | Cho |
| 2004/0084579 | A1 | 5/2004 | Lee |
| 2004/0113031 | A1 | 6/2004 | Sung |
| 2004/0118984 | A1 | 6/2004 | Kim |
| 2004/0188573 | A1 | 9/2004 | Weatherly |
| 2004/0188574 | A1 | 9/2004 | Weatherly |
| 2004/0211870 | A1 | 10/2004 | Bremmon |
| 2004/0256524 | A1 | 12/2004 | Beck |
| 2005/0041379 | A1 | 2/2005 | Jang |
| 2005/0045782 | A1 | 3/2005 | Lee |
| 2005/0167549 | A1 | 8/2005 | Ligertwood |
| 2005/0236530 | A1 | 10/2005 | Weatherly |
| 2007/0246629 | A1 | 10/2007 | Saxton |
| 2007/0252919 | A1 | 11/2007 | McGreevy |
| 2008/0156949 | A1 | 7/2008 | Sculler |
| 2009/0039212 | A1 | 2/2009 | Whalen |
| 2011/0043978 | A1 | 2/2011 | Bremmon |
| 2011/0079688 | A1 | 4/2011 | Grove |

OTHER PUBLICATIONS

Installation instructions of Omnimount U3 Tilt Mount, Mar. 10, 2004, pp. 1-6.
Omnimount TVM-27B 27 Single Pivot TV Wall Mount:, Pronto.com http://www.pronto.com/compare/omnimount-tvm27b-tvm27b-single-pivot 10305636039 (Accessed May 12, 2010).
STC Space Saver TV and VCR/DVD Combo Mount up to 27-Inch Amazon.com http://www.amazon.com/Space-Saver_Combo_Mount-27 Inch/dp/B001B)B89Q/ref=pd_sbs_op_2 (Accessed May 12, 2011).
Commercial literature entitled "Bell'O simply . . . beautiful Home Theater Furniture, 2006 New Model Introductions".
Price listing entitled, "Pro Bell'O Collection of Fine Home Theater Furniture 2006 New Model Introductions Confidential Price Schedule".
Commercial Literature entitled "Brateck Bracket Technology," Lumi Legend Corporation, Brateck Enterprises, Ltd.
Instruction manual entitled "Plasma Swinging Floater w/Mounting Bracket-Black PLSFLMB-B" Väs Furniture Mfg. Inc.
Instruction manual entitled, "Assembly Instructions for PP-59 Optional Flat Panel TV Mounting System," Bell'O International Corp.
Instruction manual entitled, "AVS-425 Assembly Instructions," Bell'O International Corp.
Instruction manual entitled, "Cappuccino 60 TV Stand HT7602," Golden Oak Furniture Mfg.
Instruction manual entitled, "Urban Wall TV Console and Plasma Floater," UL60ECPF Whalen Furniture Mfg.
FAVS-02 Instruction Sheet.
Whalen Cappuccino HT7102.
Omnimount 63FBHD-T Specification Sheet.
Omnimount U1T: Universal Flat Panel Tilt Mount Installation Manual.
Omnimount U2T: Universal Flat Panel Tilt Mount Installation Manual.
Omnimount U3T: Universal Flat Panel Tilt Mount Installation Manual.
Omnimount UCL Installation Guide.
Ready Set Mount CC-K9 Instructions ("RSM").
TechCraft PLM50 Kit and Assembly Instructions.
Whalen Furniture Manufacturing, Inc. ICWFPS Innovation Console with Flat Panel Solution Assembly Instructions ("ICWFPS").
Z-Line Zephyr TV Stand.
Whalen Furniture Manufacturing, Inc.'s AVC552-8VS Kit (Omega) and Assembly Instructions.
Whalen Furniture Manufacturing, Inc.'s XL-1 Kit and Assembly Instructions.
Z-Line Designs, Inc. Zen TV Stand Assembly Instructions.
Omnimount 54FB-F Assembly Instruction.

(56) References Cited

OTHER PUBLICATIONS

Omnimount G3FP Installation Instruction.
Consolidated Claim Construction Order 3:11-cv-02958.
Z-Line Designs Consolidated Final Invalidity Contentions 3:11-cv-02958.
Bell'O International Consolidated Final Invalidity Contentions 3:11-cv-02958.
Techcraft, Inc. Consolidated Final Invalidity Contentions 3:11-cv-02958.
Walker Edison Consolidated Final Invalidity Contentions 3:11-cv-02958.
95002619 Original Request for Reexamination.
95002619 Declaration of Marc Sculler with Exhibits.
95002619 Declaration of Steve Sculler with Exhibits.
95002619 Non-Final Office Action.
95002619 Patent Owner Response to Non-Final Office Action.
95002619 Third Party Requester Comments to Patent Owner Response.
95002619 Supplemental Declaration of Marc Sculler w/ Exhibits (filed with TPR Comments).
95002619 Patent Owner Substitute Response (exceeded Page limit).

\* cited by examiner

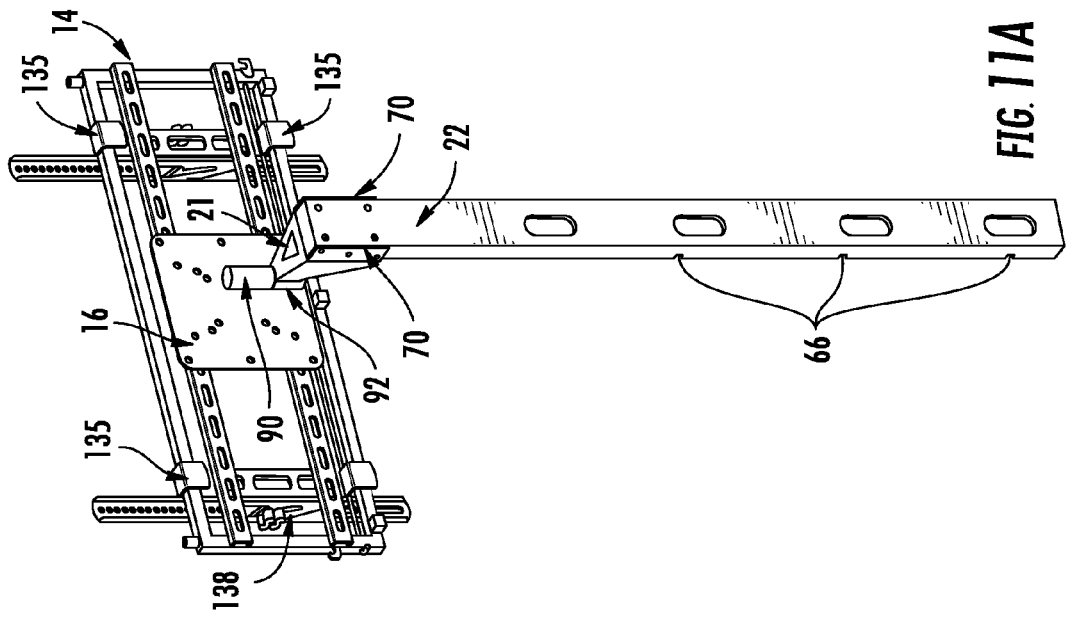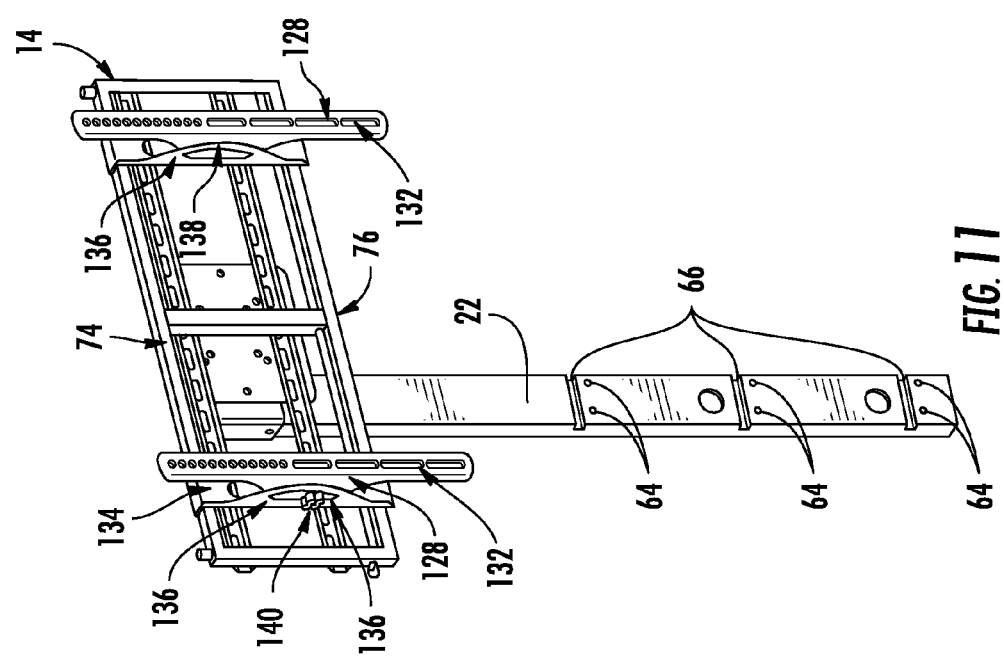

TELEVISION SUPPORT AND MOUNTING KIT

CROSS-REFERENCE TO RELATED APPLICATIONS

The instant application is a continuation-in-part of U.S. application Ser. No. 13/487,459, filed Jun. 4, 2012, which is a continuation of U.S. application Ser. No. 13/316,792, filed Dec. 12, 2011, now U.S. Pat. No. 8,191,485 issued Jun. 5, 2012, which is a continuation of U.S. application Ser. No. 11/860,271, filed Sep. 24, 2007, now U.S. Pat. No. 8,079,311, issued Dec. 20, 2011, which is a continuation-in-part of U.S. application Ser. No. 11/890,828 filed Aug. 8, 2007, now abandoned.

The instant application is also a continuation-in-part of U.S. application Ser. No. 12/417,902, filed Apr. 3, 2009, which is a continuation of U.S. application Ser. No. 11/135,888, filed May 24, 2005, now U.S. Pat. No. 7,530,538, issued May 12, 2009.

FIELD OF THE INVENTION

The invention is in the field of mounting systems for televisions to be wall-mounted or carried on a base (console).

BACKGROUND OF THE INVENTION

The introduction of so-called flat panel televisions has added additional complexity to the task of the purchaser to support the television on a suitable stand or to mount it from a wall or above a console. As used herein televisions should be understood to include monitors without tuners and televisions with built in tuners. Although referred to as flat panel televisions, many of these devices have substantial depth and may weigh up to 165 lbs. or more. Flat panel televisions (referred to herein as panel televisions) represent a substantial investment for the purchaser and therefore mounting them without damaging them during the installation or thereafter, is a major concern.

Panel television manufacturers normally make a bracket system to mount the panel television on a wall. However, purchasers may prefer to use a stand, or to position the panel television on a console. For that reason mounting systems are sold separately. This forces the panel television retailer to carry a large inventory of incompatible mounting systems, or to leave the consumer to purchase the mounting system directly from the manufacturer. A purchase direct from the manufacturer forces the consumer to wait for an extended period while the mounting system is shipped and leads to dissatisfaction with the retailer for not stocking the mounting system for the panel television purchased.

Prior art mounting systems also require a high degree of skill in mounting the system to the wall or other support and then securing the television on the mount. The resulting installation is likely (as a consequence of stud position) to be offset from the ideal position. Additionally the manufacture's system provides only one mode of mounting, such as wall mount or stand mount.

It is therefore desirable to have a universal television support and mounting kit that accommodates the principal varieties of televisions that have to be mounted, namely CRT type, and two panel types (plasma and LCD), in a single kit that allows the consumer to employ any of the three modes of support, namely stand mount, console mount and wall mount.

SUMMARY OF THE INVENTION

The present invention resolves the deficiencies of prior art solutions by providing a kit that includes a plurality of components to accomplish all of the desired mounting configurations. The components are designed to be economical to manufacture and easy to assemble with common tools. By selective assembly of the provided components, the user can elect to support a wide range of televisions on a console, suspended above a support, or mounted to a wall. Kit components are designed to be used in as many of the different configurations as possible.

In a first exemplary embodiment, the kit incorporates components for a console with multiple shelves carried on shelf supports. A short spine is provided for use when the console is to be used to support a television on a stand on the upper shelf. The short spine has mounting openings that engage the shelf supports and extends between the floor, or lowest shelf support, to the upper most shelf support. A console with three shelves, and therefore three shelf supports, is described as exemplary.

In a first configuration, the short spine connects to the shelf supports to increase the weight carrying capacity of the shelves and transfer the weight to the floor. Using the short spine allows the user to assemble a console with an upper surface that can carry a conventional (CRT) television or a panel television with a stand. The spine is preferably of a rectangular hollow cross-section. The use of a rectangular configuration allows more of the spine to be in contact with the shelf supports than would a circular cross-section, for example. The spine has a plurality of openings in a rear surface thereof. Because the spine is hollow, these openings permit wires and cabling to be run internally between, for example, electronic equipment on the shelves and the panel television, thus preventing entanglement of the wires and cables and improving the finished appearance of the installation. The kit further includes a long spine, a horizontal offset support arm (offset arm) and a panel television mounting structure on the arm.

In another configuration, the long spine is utilized. Since it also attaches to the shelf supports, it provides for the transfer of loads carried on the shelves, but in addition extends above the console to provide an elevated support for a panel television. The offset arm extends horizontally forward (as mounted) to suspend the panel television over the console base and give the panel a floating appearance. The offset support incorporates an offset arm that carries a mounting structure. In one embodiment, the mounting structure has a spaced structural support with a hole pattern that provides mounting openings for mating the structure to the rear of a panel television. In the exemplary embodiment the mounting structure is in the form of a mounting plate but could be formed, for example, of spaced radial arms. Many panel televisions, especially LCD panel televisions contain hard points with threaded holes with standard spacing (the VESA standard). The mounting structure has openings matching the VESA standard so that the structure is easily bolted to the television to carry the television above the console.

Spacing the mounting structure and therefore the television forward of the spine, allows for the incorporation of pivoting and titling mechanisms in the offset arm. The offset arm incorporates mating tilting brackets that are hinged together at their upper ends and free for limited pivoting rotation at the lower ends. This allows the installed panel television to be aimed down to face the level at which the television will be viewed (such as at the level of facing chairs or other furniture). The tilting mechanism is locked in the selected position with fasteners at the lower end of the tilting brackets. The offset arm has a pivot mount at its outer end that cooperates with a pivot mount on the mounting structure to constrain a pivot pin. The pivot mounts collectively provide for pivoting the panel television about a substantially vertical axis so that the television can be turned to face the viewing area or to avoid glare.

Another component of the kit is a mounting frame. The mounting frame can accommodate a wide range of non-standard hole patterns. The frame is designed so that it can be used in conjunction with the offset arm on the upper end of the long spine, or for directly mounting a panel television to a wall. The mounting frame is useful for larger panel televisions and those which don't use a standard mounting hole pattern. These panel televisions may also be heavier and therefore, without special provisions, lifting and attaching the television to a mounting device would difficult or impossible for the average consumer.

The mounting frame incorporates two spaced channels, with U-shaped cross-section, that are oriented to be horizontal when mounted. The channels lie in a plane. The channels are formed with a center web and two sides arranged at right angles to the web. The webs have spaced holes along their length. At least one rail is carried on the frame. In the exemplary embodiment two rails are provided. The rails lie in a second plane spaced horizontally from the first plane. This spacing permits the panel television to be easily lifted and attached as will be described. The channels and rails are joined together in a unitary structure by vertical elements that extend between and are secured to the rails. In the exemplary embodiment the vertical elements and rails are comprised of rectangular tube stock which provides the necessary rigidity at low cost.

The connection of the panel television to the mounting frame is made through panel mounting brackets. These brackets are not interconnected so that they can be positioned anywhere along the back of the panel television to connect to the threaded holes in hard points on the back of the panel television. They can desirably be formed of stock similar to the channels and include parallel sides and a right angularly related connecting web. The web has multiple spaced holes along its length. The web is placed against the panel television and fasteners are passed through the holes to secure the brackets to the panel television. Each bracket includes at least one, and preferably, two rail engagement hooks. Where two hooks are employed, they are spaced the same distance apart as are the rails on the mounting frame.

For attachment of the mounting frame on an offset arm with a mounting plate fitted, the holes on the mounting plate are aligned with holes on the channels and then secured together with fasteners. Then the panel television, with the panel mounting brackets installed, is lifted into position. The hooks are received over the rails and the television lowered into position. The panel television is then free to pivot and tilt as in a VESA-standard mounted television.

The same mounting frame can be employed to wall-mount a panel television. In this configuration, the console is used in a standalone configuration beneath, or nearby, in conjunction with the wall mounted flat panel television. In a wall mount, the channels are secured to the wall. Normally, it is necessary to locate a pair of studs to insure that connection between the wall and frame is sufficiently strong to support the frame and panel television. Standard and non-standard stud spacing is accommodated because the channels extend across the full width of the frame and have multiple spaced holes. After the mounting frame is securely mounted to the wall through the frame channels, the panel television can be lifted so that the engagement hooks pass over the rails and then are lowered with the panel television to engage and be supported from the rails. The rails are longer than all but the largest televisions and therefore, the television may be moved horizontally on the rails to center it perfectly relative to, for example, a wall alcove. Stops prevent movement beyond the ends of the rails.

In both the wall-mount and offset arm mount of the mounting frame, the security of the connection between the panel television and mount structure is enhanced by a removable latch which is inserted through the vertical channel members above the hooks so that the hooks cannot be lifted off of the rails.

In another exemplary embodiment, the short spine and long spine are reconfigured into a two-part spine where the lower spine portion is always used as a structural component of the console in all of the configurations. The long spine is replaced with a shorter "spine extension" having a neck at the lower end which inserts into the upper end of the lower structural spine and extends above the upper surface of the upper shelf.

The invention as described has advantages for the consumer and the retailer. For the retailer, stocking the kit avoids having to stock multiple disparate kits, avoids creating a customer service burden and helps the consumer select the right kit, and avoids restocking costs when kits are returned. For the consumer, the kit satisfies the mounting requirements for virtually any television that the consumer might initially use it with, and any television that the consumer may acquire in the future. In a first configuration, the console may be assembled and used alone with a conventional CRT television, or with a panel mount on a stand. Then later when the consumer acquires a VESA standard LCD television, for example, the consumer can substitute the long spine and offset arm and suspend the panel television above the console for a second configuration. Should the consumer later prefer wall mounting, the mounting frame can be used to mount the television on a wall above the console.

The kit incorporates multi-purpose components to reduce the parts count. All components can be broken down to lie flat for shipping and storage in the minimum space. The kit provides for a floating appearance of the panel television above a console and this visual effect is enhanced by being able to hide the wires and cables within the support. Wall mounting is accomplished with minimum need to "work behind" the panel television because the panel television is merely lifted on the rails and supported without having to manipulate additional fasteners. The use of two engagement hooks on each bracket prevents the panel television from swinging from the upper rail before it is secured by other means.

Other objects, features and advantages of the invention shall become apparent as the description thereof proceeds when considered in connection with the accompanying illustrative drawings.

DESCRIPTION OF THE DRAWINGS

In the drawings which illustrate the best modes presently contemplated for carrying out the present invention:

FIG. 11 is a front perspective view of an alternative configuration for mounting frame with panel brackets which accommodate a titling mechanism;

FIG. 11A is a rear perspective of the configuration of FIG. 11, showing an non-tilting pivot bearing;

DESCRIPTION OF THE PREFERRED EMBODIMENT

A first exemplary embodiment of the television support and mounting kit is illustrated and generally indicated at 5 in FIGS. 1-12.

Figure 1A:
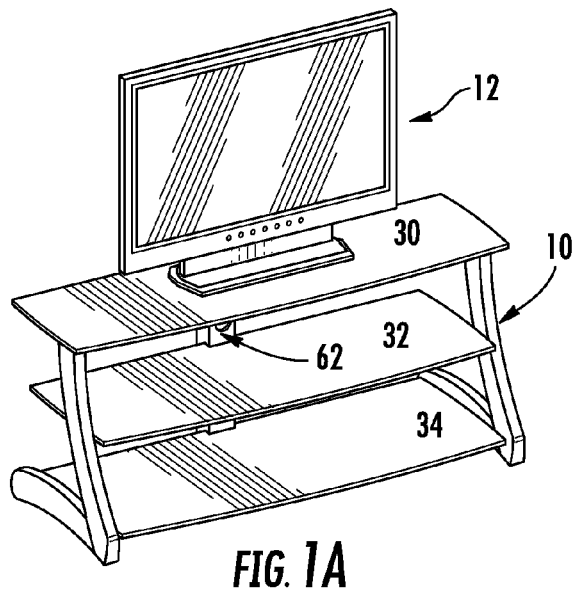
FIGS. 1A, 1B and 1C illustrate different configurations of a first exemplary embodiment of a kit in accordance with the invention.
Figure 1B:
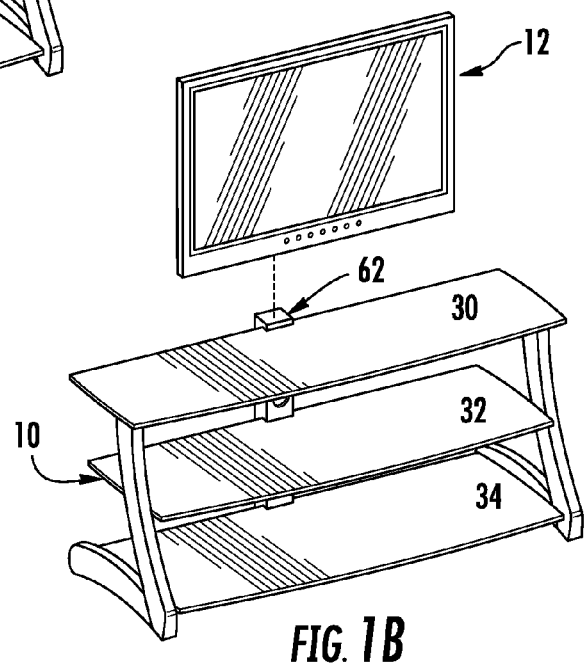
Figure 1C:
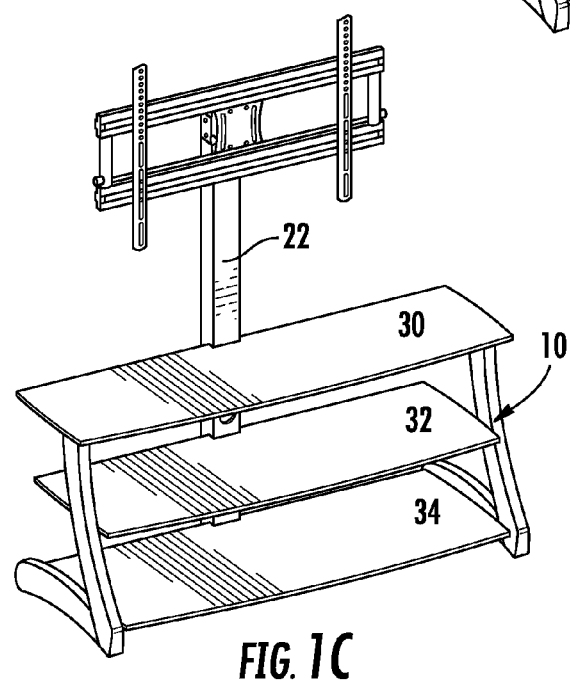

Referring to FIGS. 1A, 1B and 1C, the kit 5 is shown assembled into its three different configurations.

Figure 2:
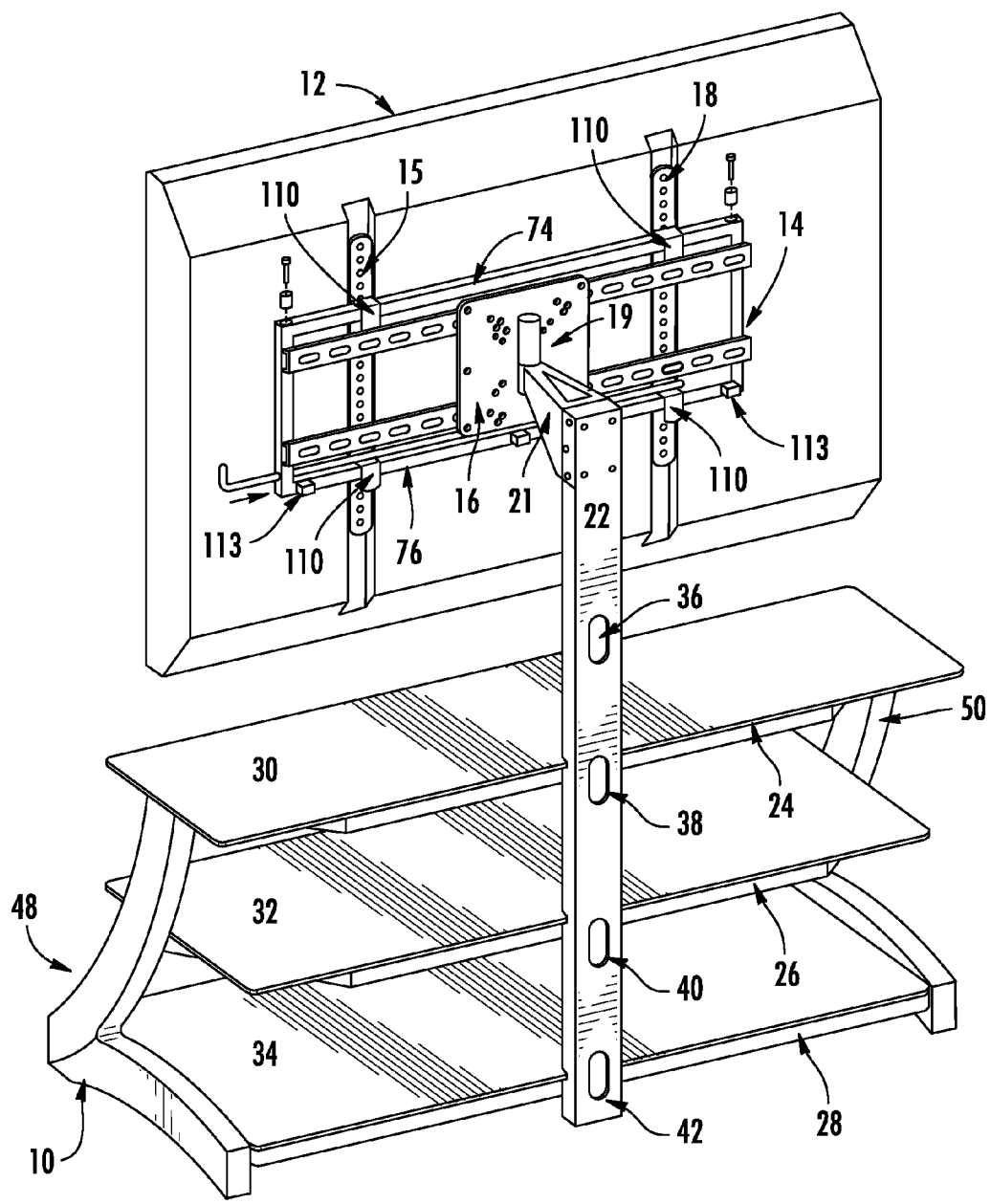
FIG. 2 is a rear perspective view thereof showing the television support and mounting kit supporting a panel television above a console and utilizing the mounting frame mount on the offset arm.

Referring now to FIG. 2, there is illustrated a console base 10 carrying a panel television 12 using a mounting frame 14 connection to the panel television through panel brackets 15 and 18. The panel brackets incorporate rail engagement hooks 110. When supporting the panel television 12, the hooks 110 are received over rails 74 and 76. Limited left and right movement of the panel television on the mounting frame 14 is possible until the hooks engage the stops 113. The mounting frame 14 is carried by the offset arm 21 through a mounting structure which includes mounting plate 16 and pivot bearing 19. The mounting plate 16 is connected by the pivot bearing 19 and the offset arm 21 to the long spine 22.

Spine 22, in combination with the side panels 48 and 50, supports the television 12 and the shelf supports 24, 26 and 28 (partially visible). The shelf supports, in turn, carry the shelves 30, 32 and 34. The spine 22 contains wire and cable openings 36, 38, 40 and 42.

Figure 3:
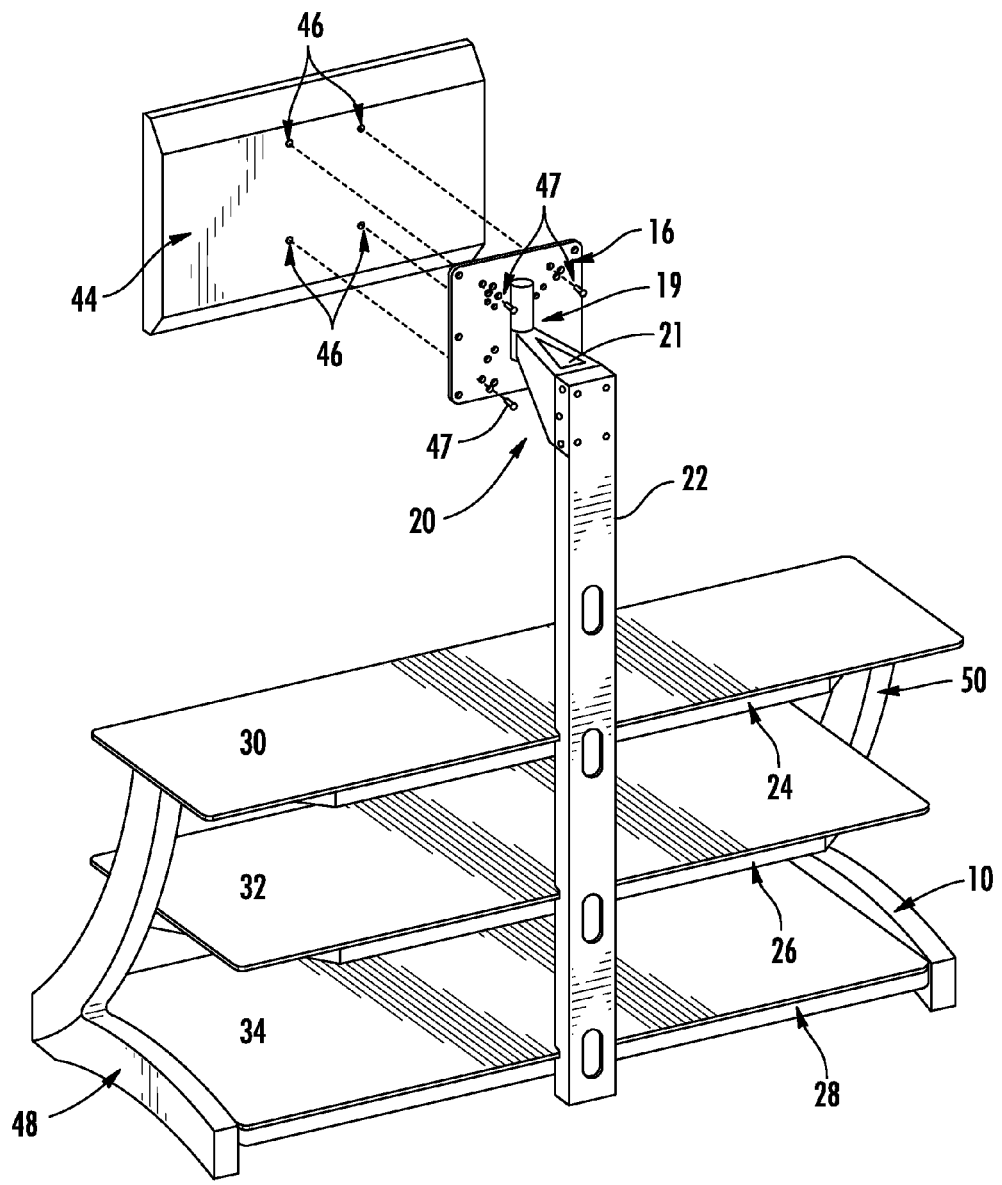
FIG. 3 is a perspective view thereof showing the television support and mounting kit supporting a television above a console utilizing the mounting plate and offset arm.

FIG. 3 shows the same console base 10, supporting panel television 44 that has four standard hard points with threaded bores 46. These bores match up with a set of four holes on the plate 16 so that the panel television 44 is supported directly from the plate 16 by inserting fasteners 47 into the bores 46.

The VESA Standard currently calls for all LCD panel televisions to have at least four hard points and threaded holes positioned at the corners of a rectangular shape with distances between the holes being:

75 mm×75 mm
100 mm×100 mm
200 mm×100 mm
200 mm×200 mm
400 mm×200 mm

The plate 16 has holes to accommodate LCD televisions with all of these hole patterns.

Figure 4:
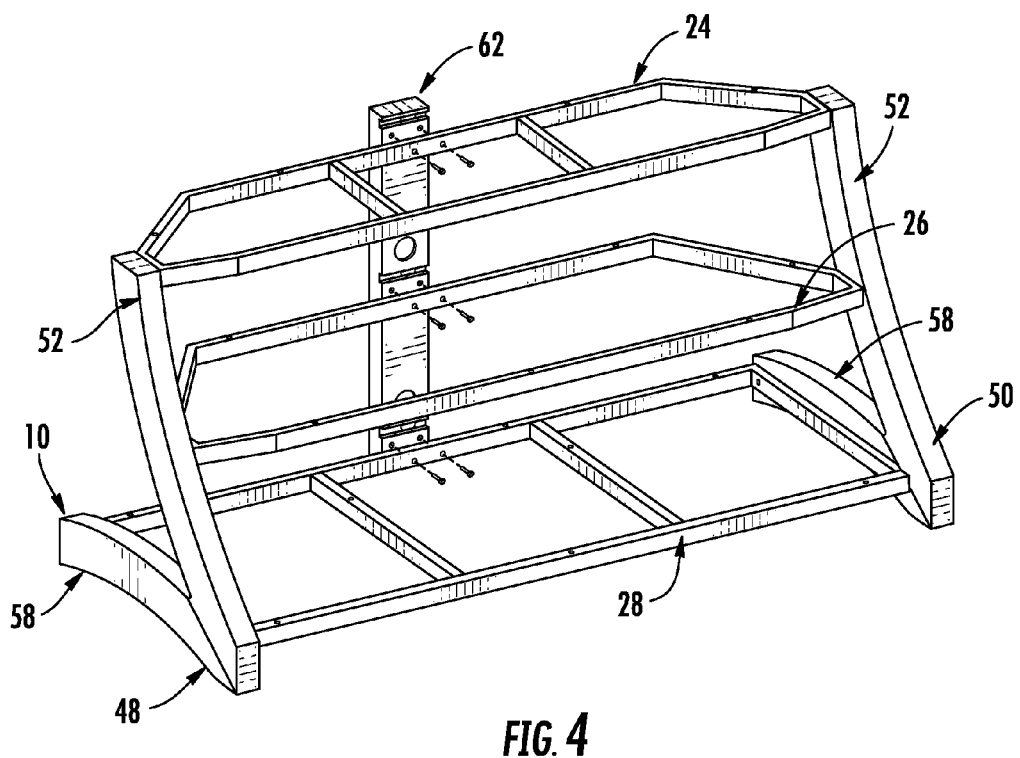
FIG. 4 shows the console structure with short spine and shelf supports in place.

FIG. 4 shows the details of the structure for the console 10, which incorporates side panels 48 and 50. The upper members 52 of the side panels support the upper shelf supports 24 and 26. The lower members 58 of the side panels support the console from the floor and support the lowermost shelf support 28. The illustrated console is shown assembled with the short spine 62 which is bolted to the shelf supports 24, 26 and 28 and so cooperates with the side panels 48 and 50 to support weight carried on the upper shelves to the lower shelf support 28 and the floor on which the console rests.

Figure 5:
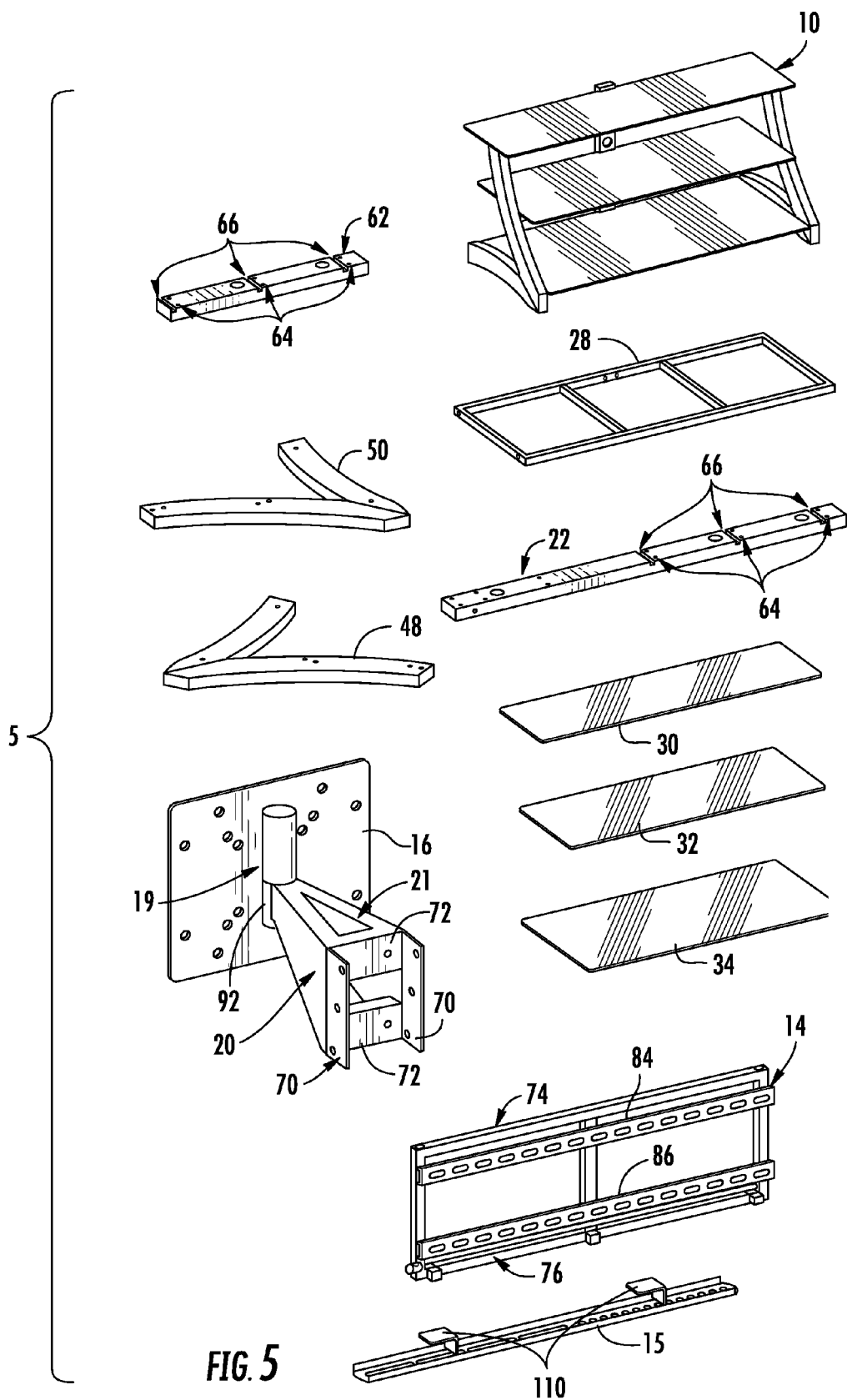
FIG. 5 is a collective figure showing the primary structural components of the kit.

FIG. 5 shows the primary structural components of the first embodiment of the kit including the short spine 62 and long spine 22. As will appear, the spines 22, 62 each have a series of spaced fastener openings 64 which permit the spines 22, 62 to be secured to the shelf supports 24, 26, 28 and a series of spaced shelf slits 66 which accommodate that portion of the shelves 30, 32, 34 that overlie the shelf supports. The side panels 50 and 52 are part of the kit as are the shelves 30, 32 and 34. A single shelf support 28 is representative of the three shelf supports in the full kit. The offset mount 20 is included. The illustrated offset mount 20 is one without the tilt mechanism but includes the mounting plate 16, the pivot bearing 19 and the offset arm 21, with vertical flanges 70 and horizontal flanges 72 for connection to the long spine 22.

A panel bracket 15 with engagement hooks 110 is representative of the two brackets that are part of the kit. The mounting frame 14 is included for mounting larger televisions, televisions with non-standard hole patterns and for wall mounting.

The kit may alternatively or additionally include a tilting offset mount and/or a mounting frame that includes panel brackets 15, 18 with a tilting mechanism, which will be described hereinbelow.

Figure 6:
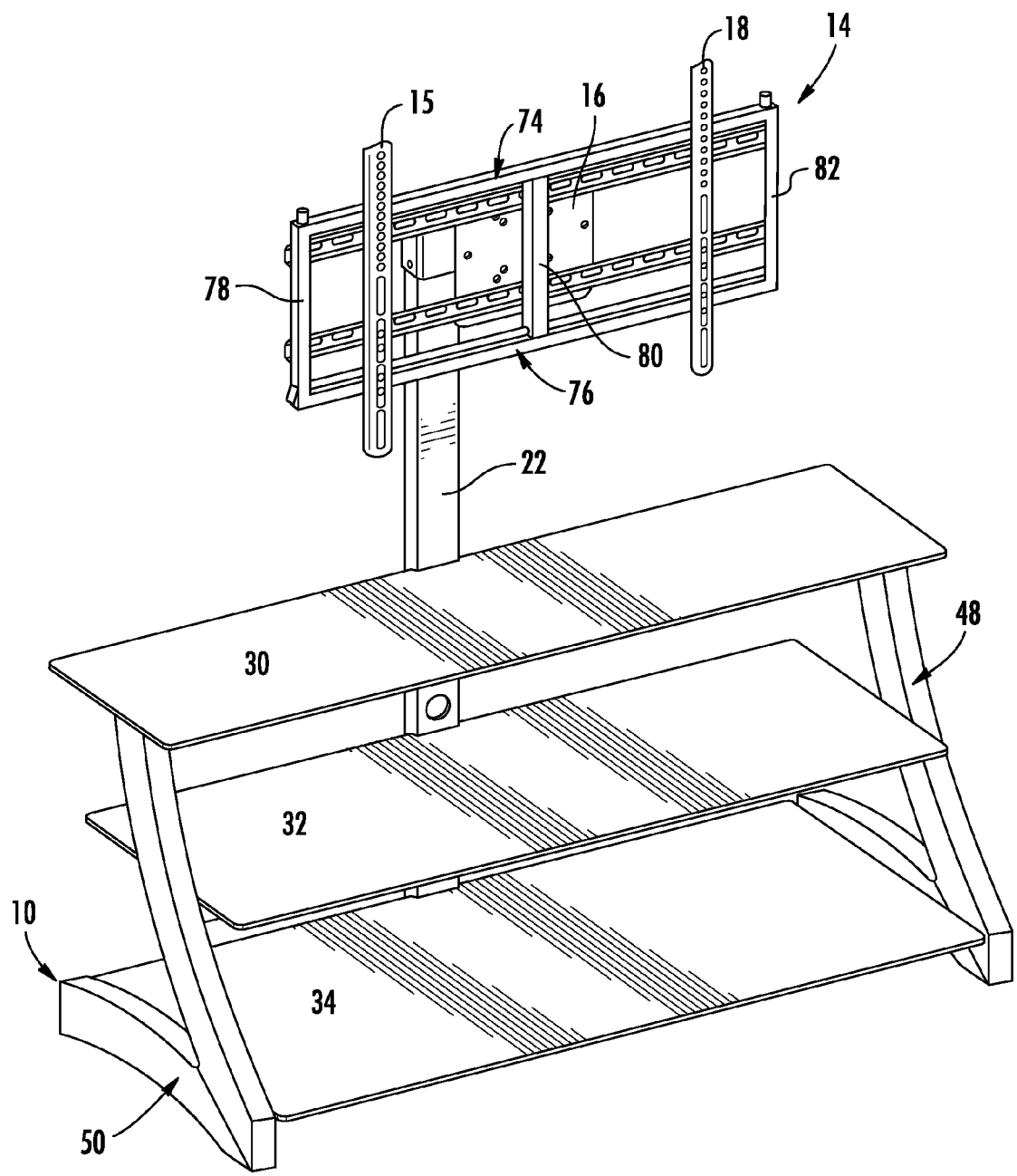
FIG. 6 is a front perspective view thereof showing of the television support with the mounting frame configured for mounting a panel television with a non-standard hole pattern above a console.

FIG. 6 is a front view of a console assembled with long spine 22. The installation is shown configured for use with a panel television to be carried on mounting frame 14. The panel brackets 15 and 18 are shown in position over, and carried by, the rails 74 and 76 of the mounting frame 14. The panel television (12 or 44), which would be attached to the brackets 15 and 18 is not shown for clarity.

Figure 7:
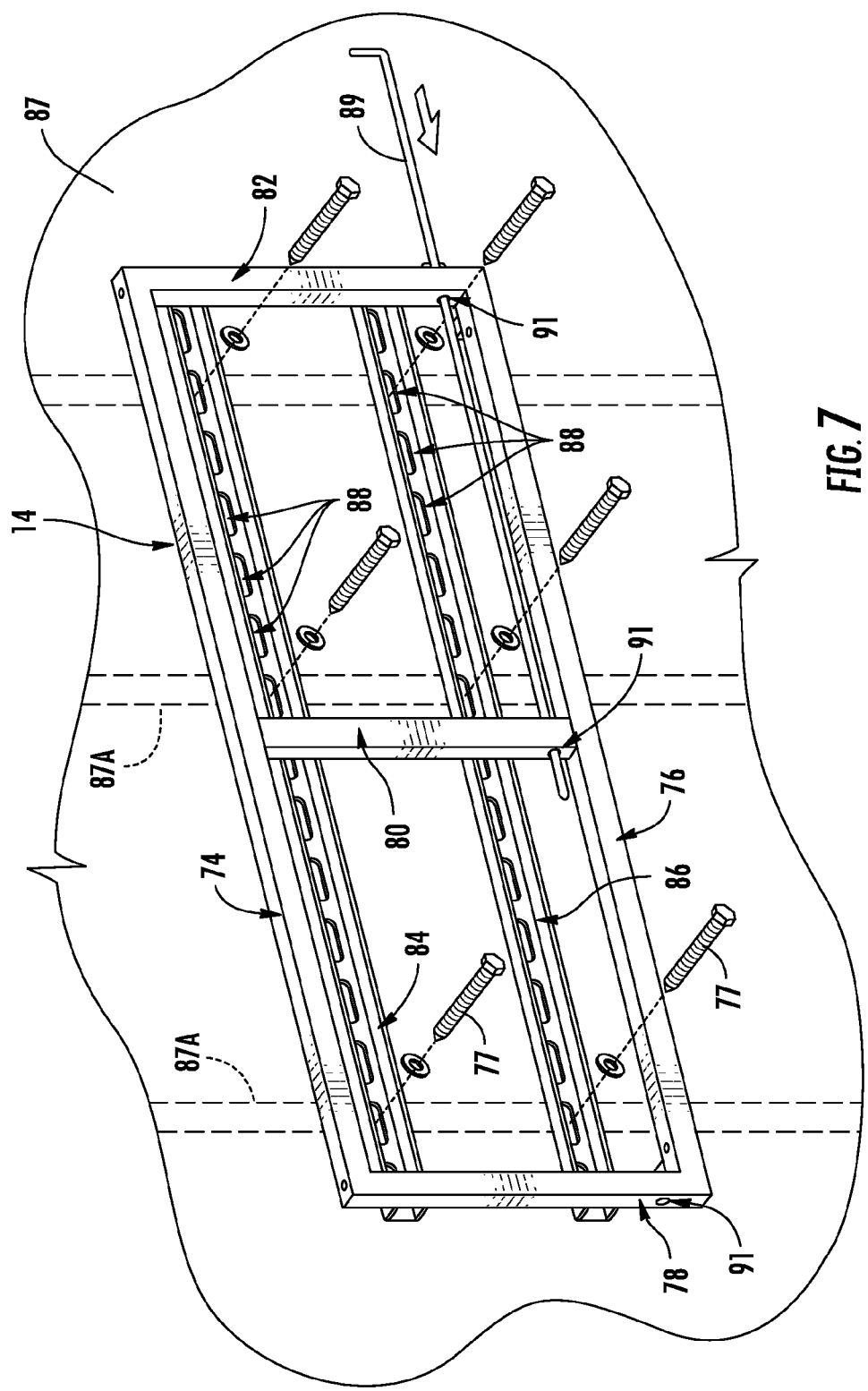
FIG. 7 is a perspective view showing the mounting frame in position to be secured a wall.

FIG. 7 shows the details of the mounting frame 14. The rails 74 and 76 are of square tubular stock and are interconnected by frame elements 78, 80 and 82 also of tubular stock. The rails and frame elements are desirably joined by welding to eliminate the need for the consumer to assemble them. A frame produced using tubular stock is as stiff as a continuous formed plate of the same size, but much less expensive to produce. Open face channels 84 and 86 bridge behind the rails and frame elements and have a series of openings of which holes 88 are representative. The open face of the channels is presented forwardly so that the consumer has access to insert and tighten lag bolts 77 that penetrate into the studs 87A or other solid structure of the wall 87. The holes 88 are elongated so that the lag bolts can be precisely aligned with the studs. These same channels are used to secure the frame mount 14 to the mounting plate 16 of the gooseneck mount 20 (see FIG. 2). A locking bar 89 is shown partially inserted in holes 91. The bar is fully inserted after a panel television and brackets is received over the rails 74 and 76. The locking bar 89 prevents the panel television from being lifted or jarred off of the rails (see FIG. 8).

Figure 8:
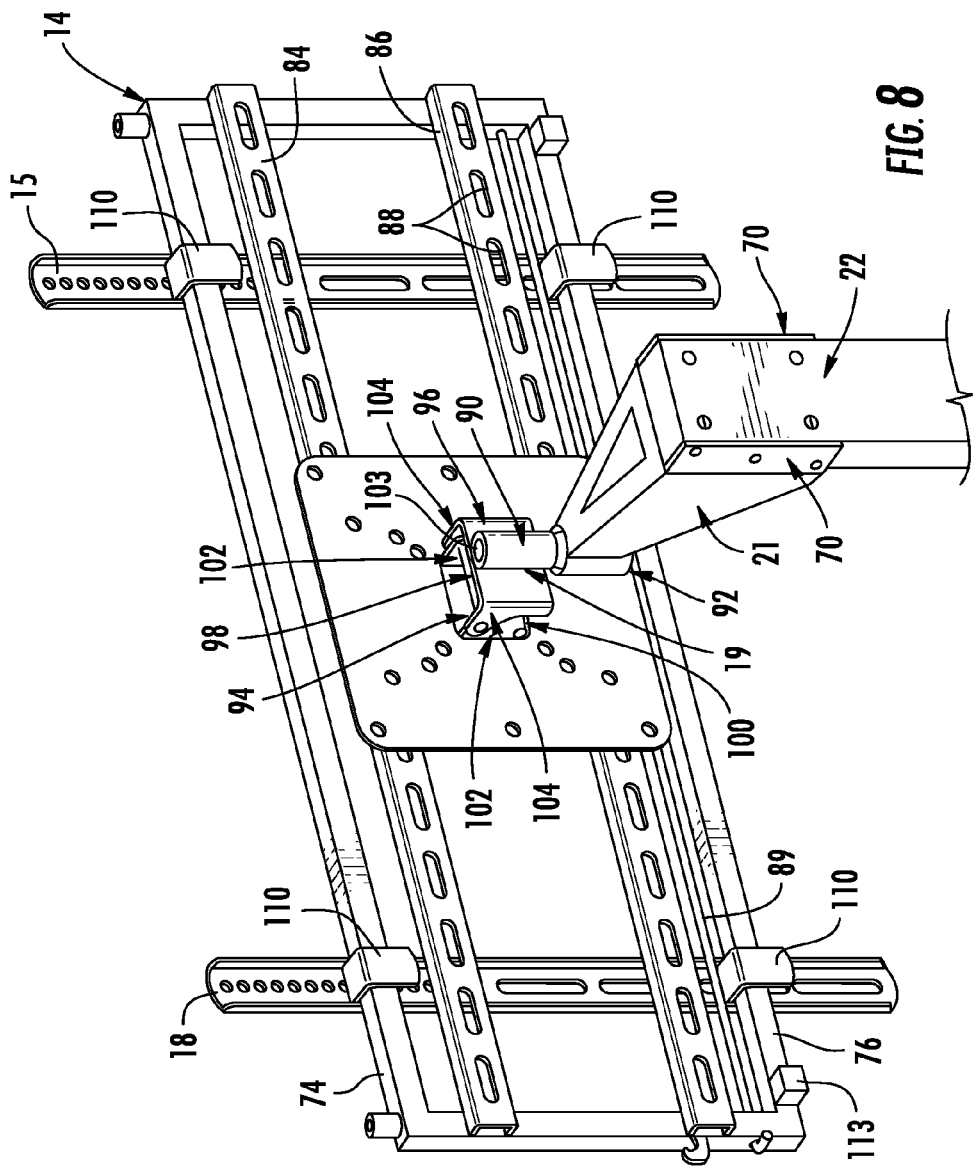
FIG. 8 is a rear perspective view of the offset arm with tilting and pivoting features in position for use on a frame mount.

FIG. 8 is a detailed view of the offset mount with the details of the tilt mount illustrated. The offset arm 21 is shown secured to the spine 22 by the flanges 70 and supports the pivot bearing 19. The pivot bearing 19 is made of a pivot pin 103 fixedly attached to the holder 90. The pivot pin is 103 received in a bearing receptacle 92. Tilt brackets 94 and 96 have overlapping flanges 102 and 104 and are hinged together at their upper ends by a horizontal hinge pin 98 received through the flanges 102, 104. The amount of pivoting is selected by rotating the hinge shaft 100 to frictionally hold the brackets in a fixed relative position as will appear in greater detail by an examination of FIG. 9.

Figure 9:
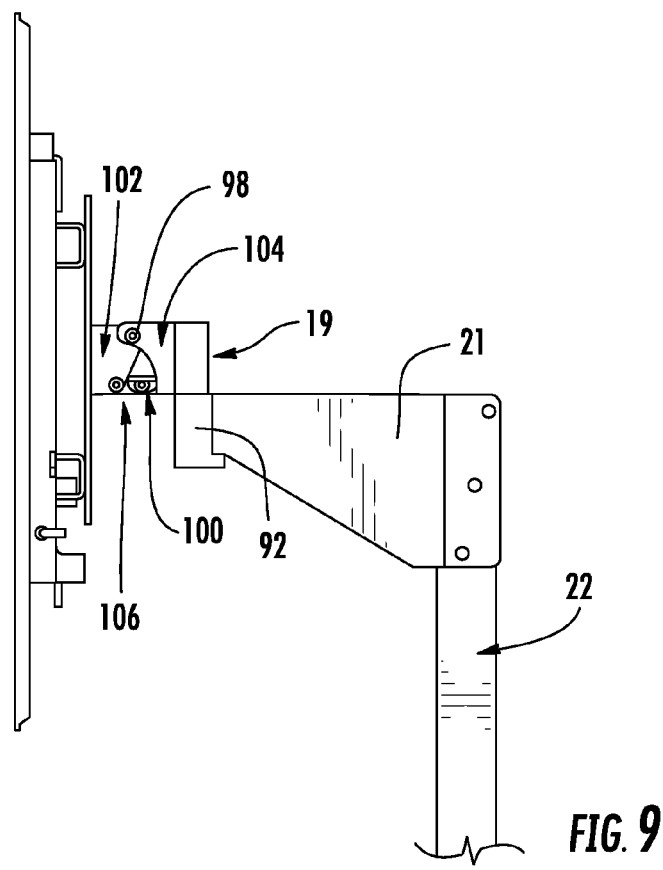
FIG. 9 is a side elevational view of the pivot bearing and tilt mechanism.

FIG. 9 shows the bracket flanges 102 and 104 which cooperate with slot 106 and hinge shaft 100 to limit the total range of tilting to a safe amount so that if the panel television moves the mount under the force of gravity and with insufficient friction developed by the shaft 100, then the total titling movement will be limited to an amount such that the television won't contact the spine or the wall 87.

Figure 9A:
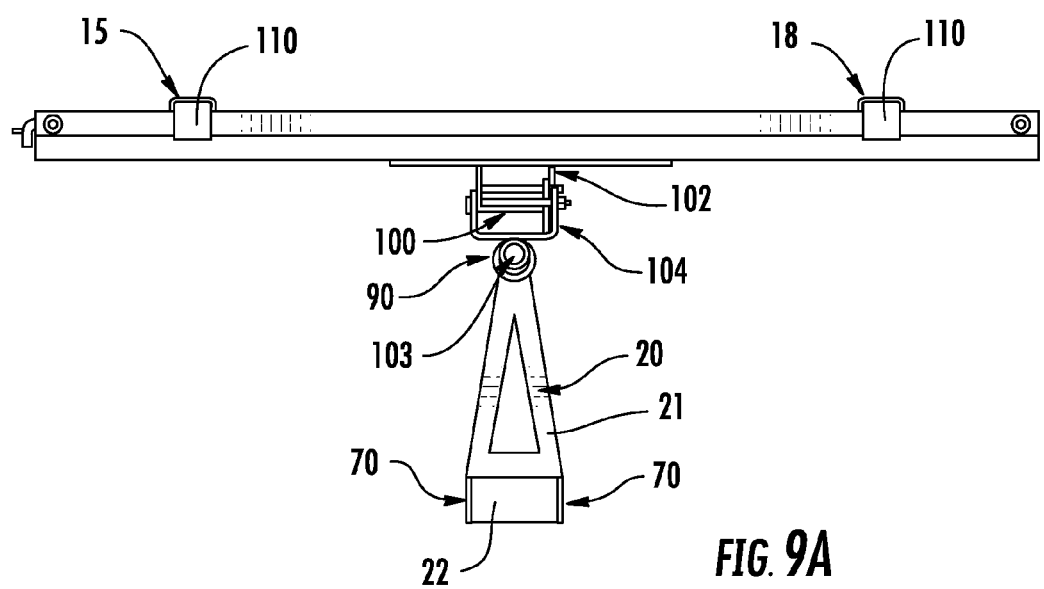
FIG. 9A is a top plan view of the pivot bearing and tilt mechanism.

FIG. 9A is a top view of the offset mount 20 and shows the pin 103 in the holder 90.

Figure 10:
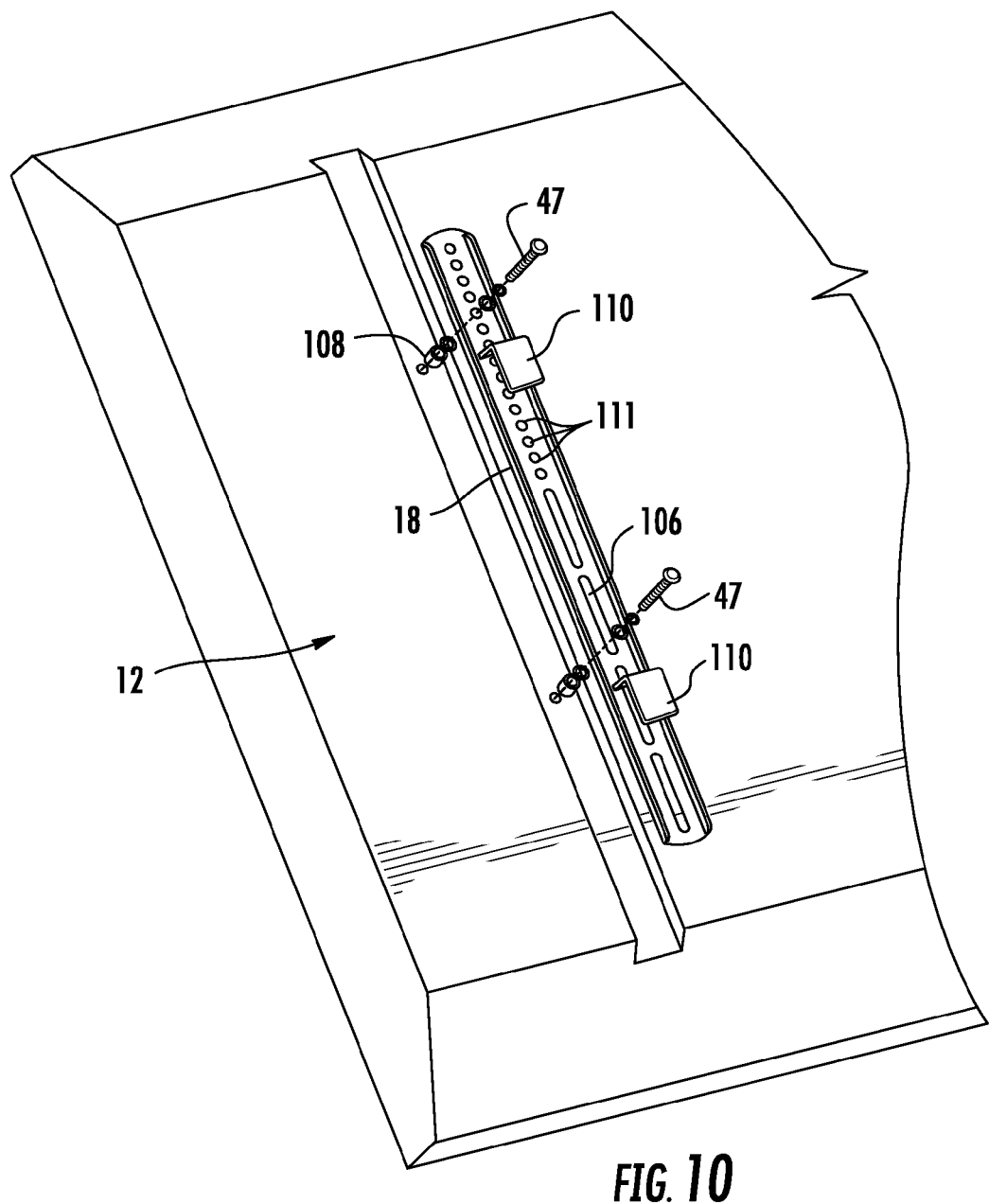
FIG. 10 is a detail view showing one of the panel brackets and the associated engagement hooks.

FIG. 10 shows an exemplary panel bracket 15. The panel bracket 15 has a series of holes 111 which allow it to adapt to virtually any hole spacing on a panel television. The mounting is accomplished through a spacer 108 selected for proper length, such as spacer 108 to insure that the rear of the panel television (such as a television with a curved back) doesn't interfere with the rails and engagement hooks 110, when the panel television is placed over the rails on the mounting frame 14.

FIGS. 11 and 11A, show an alternative version of the mounting frame 14 which includes tilting panel brackets 128 for mounting to the rear of a panel television. A rail hook flange 134 has hooks 135 received over the rails 74 and 76. The hook flange 134 has right angular related sides 136 with an arcuate slot 138. A panel television is carried on brackets 132. A handle 140 is inserted through slot 138 in flange 136 and is threaded into the bracket 132. When the handle 140 is tightened, the handle 140 bears up against the flange 136 and frictionally engages it so that the brackets 132 are held in a desired angular relationship to the frame. As will appear the tilt brackets may be used on a long spine 22 and offset arm 21. The tilt brackets also function when the mounting frame is mounted on a wall 87.

Figure 12:
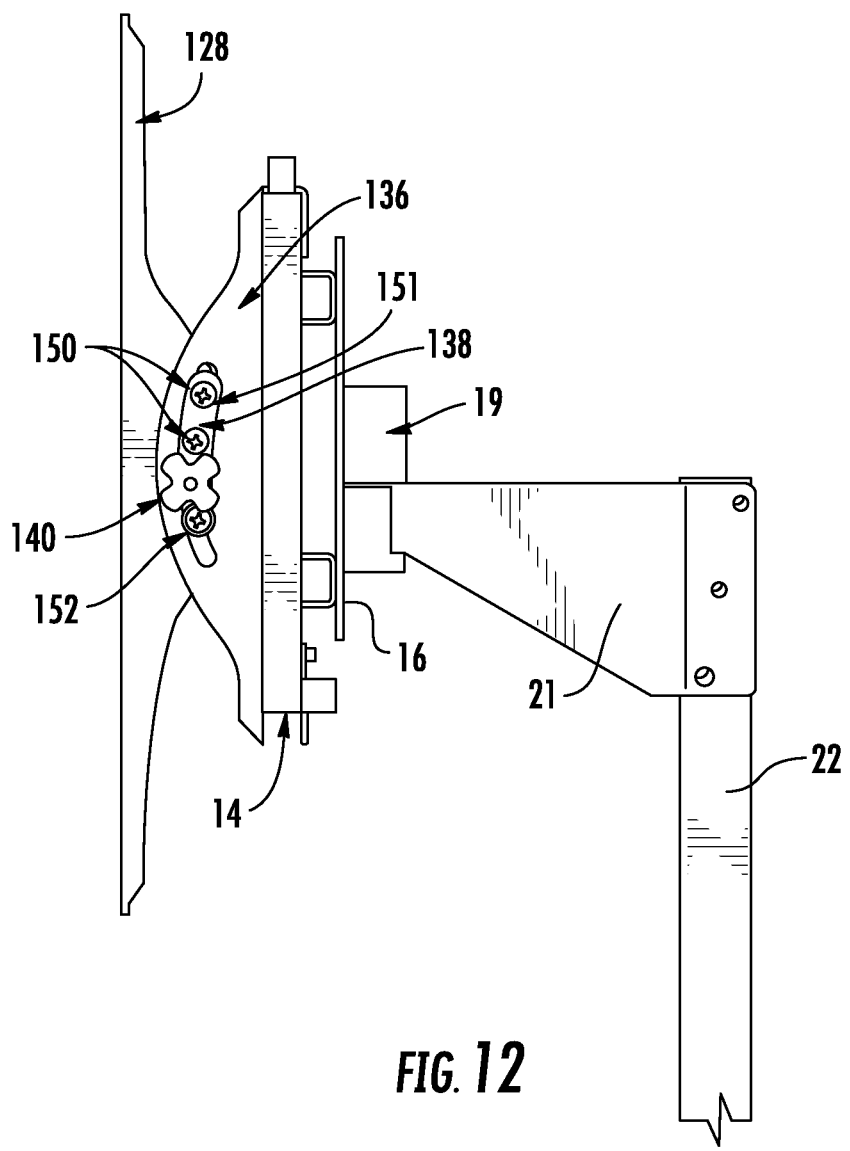
FIG. 12 is a side elevation view of the tilting mechanism for use with the mounting frame.

FIG. 12 shows the details of the tilting brackets of FIGS. 11 and 11A. The slot 138 accommodates bolts 150 with carry a guide 151. The bolts 150 and a third bolt 152 are received in the bracket 128. They act as stops for the tilting movement of a panel television carried on the brackets 132 so that the range of travel does not exceed a safe amount. The selected angle is locked in by operating of the handle 140 which frictionally engages the hook flange 136 and draws the bracket 132 into frictional engagement with the hook flange.

A second exemplary embodiment of the television support and mounting kit is illustrated and generally indicated at 200 in FIGS. 13-19.

Figure 13A:
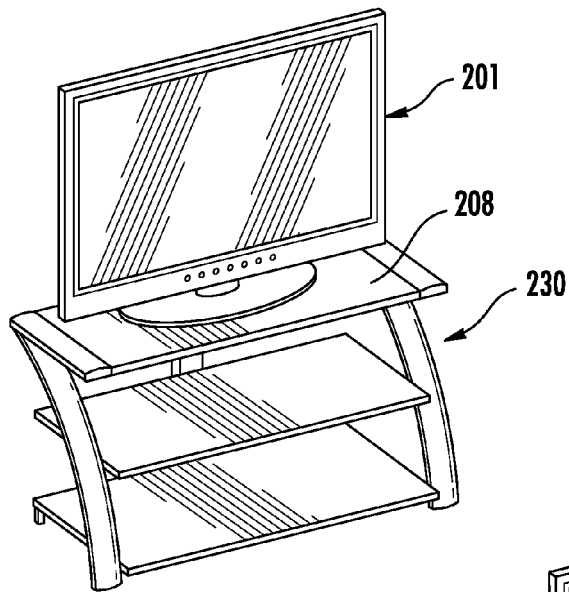
FIGS. 13A, 13B, 13C illustrate the different configurations of a second exemplary embodiment of a kit in accordance with the invention.
Figure 13B:
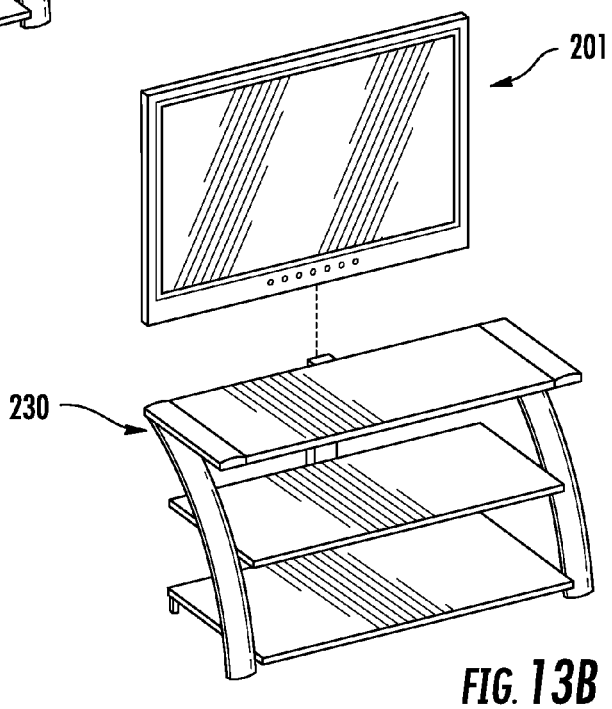
Figure 13C:
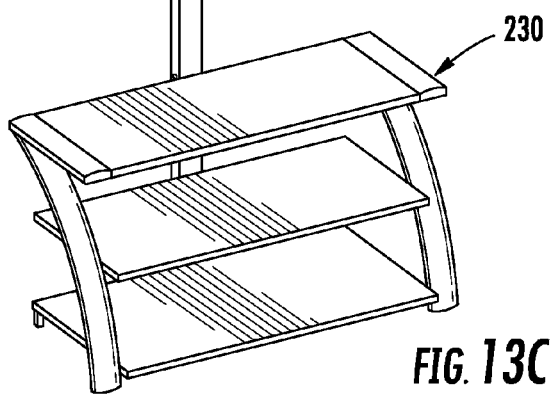

Referring to FIGS. 13A, 13B and 13C, the kit 200 is shown assembled into its three different configurations for supporting a panel television 201.

Figure 14:
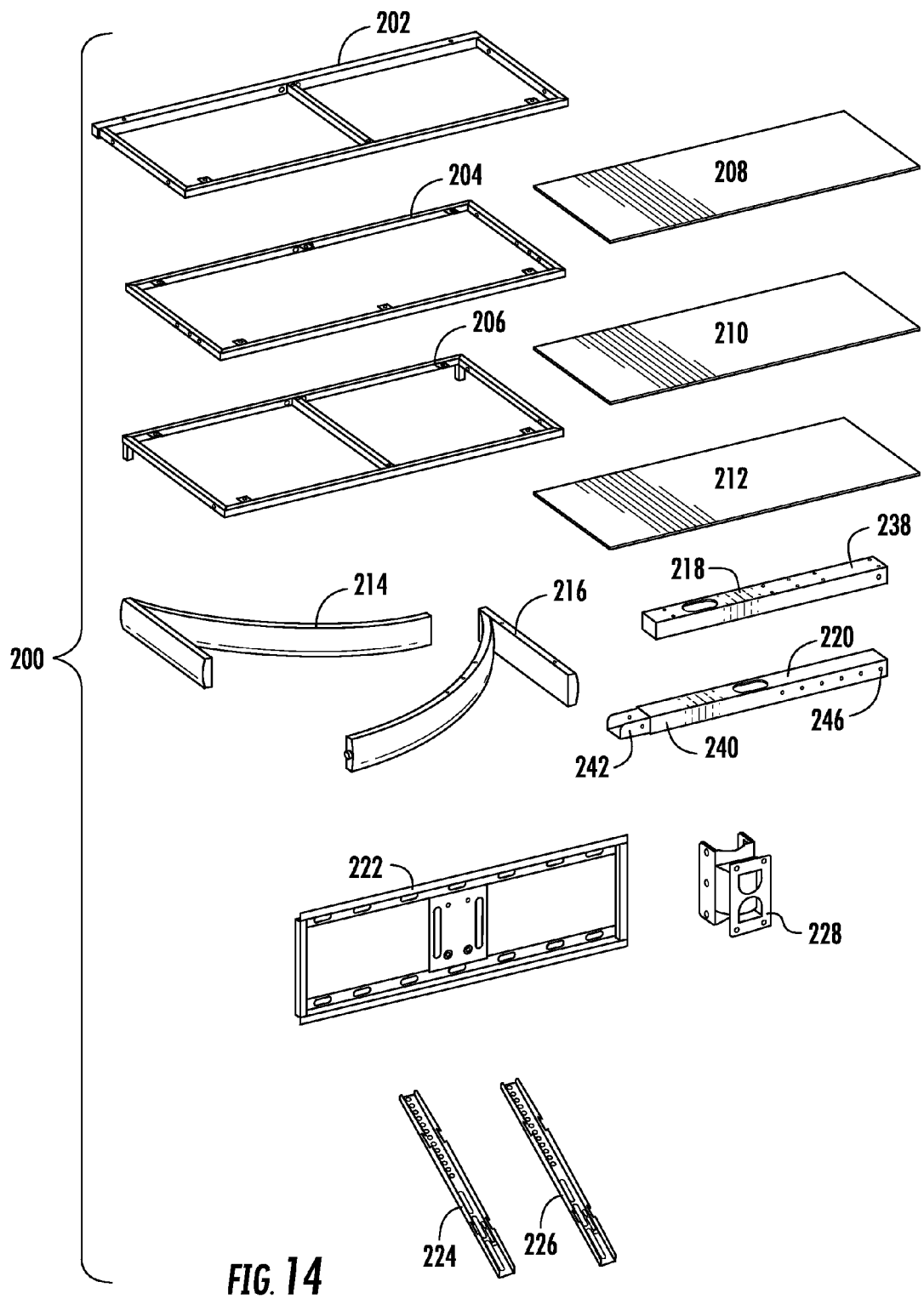
FIG. 14 is a collective figure showing the primary structural components thereof.

FIG. 14 shows the primary structural components of the second kit embodiment including upper, middle and lower shelf supports 202, 204 and 206, upper, middle and lower shelves 208, 210, and 212, left and right side panels 214, 216, a lower structural spine portion 218, an upper spine extension portion 220, a mounting frame 222, panel brackets 224, 226 and a mounting assembly 228.

The primary differences between the first embodiment 5 and the second embodiment 200 are the spine configuration and the mounting assembly. Rather than a short spine 62 and a long spine 22, this second embodiment 200 provides a spine structure where the lower structural spine portion 218 is used in all of the different configurations, and the upper spine extension portion 220 is used when supporting the television 201 above the console 230. The mounting assembly 228 looks slightly different but still includes a cantilever, or offset arm 232, a mounting plate 234 and a pivot mechanism 236 connecting the offset arm 232 and mounting plate 234.

Figure 15:
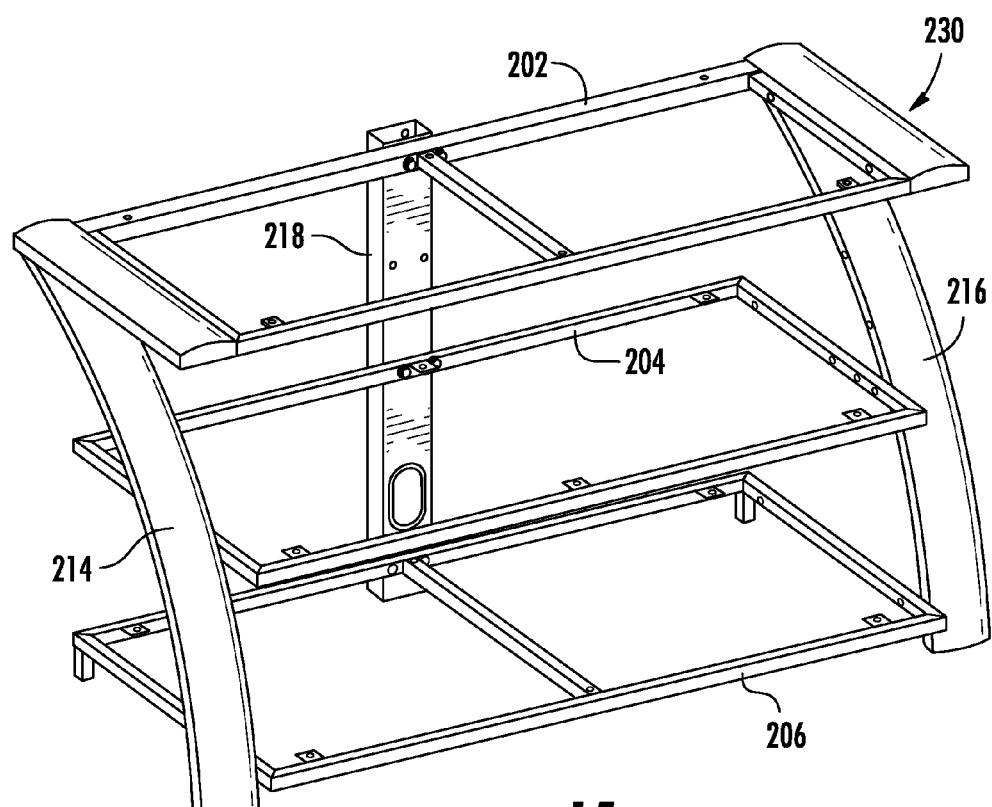
FIG. 15 is a front perspective view of the console with the structural spine attached to the back side.

Turning to FIG. 15, the console 230 is assembled with the upper, middle and lower shelf supports 202, 204, 206 attached to the left and right side panels 214, 216. The structural spine 218 is attached to the upper, middle and lower shelf supports 202, 204, 206 on the back side of the console 230 with the upper end 238 thereof terminating adjacent to the upper shelf support 202. The shelves 208, 210, 212 are then seated on top of the shelf supports 202, 204, 206 to complete the console 230. This assembly is used in the first configuration (FIG. 13A) where a panel television 201 is supported on the upper shelf 208. This assembly is also used in the second configuration (FIG. 13B) where the panel television 201 is mounted on the wall, and the console 230 is used in conjunction with the wall mounted television 201.

Figure 16:
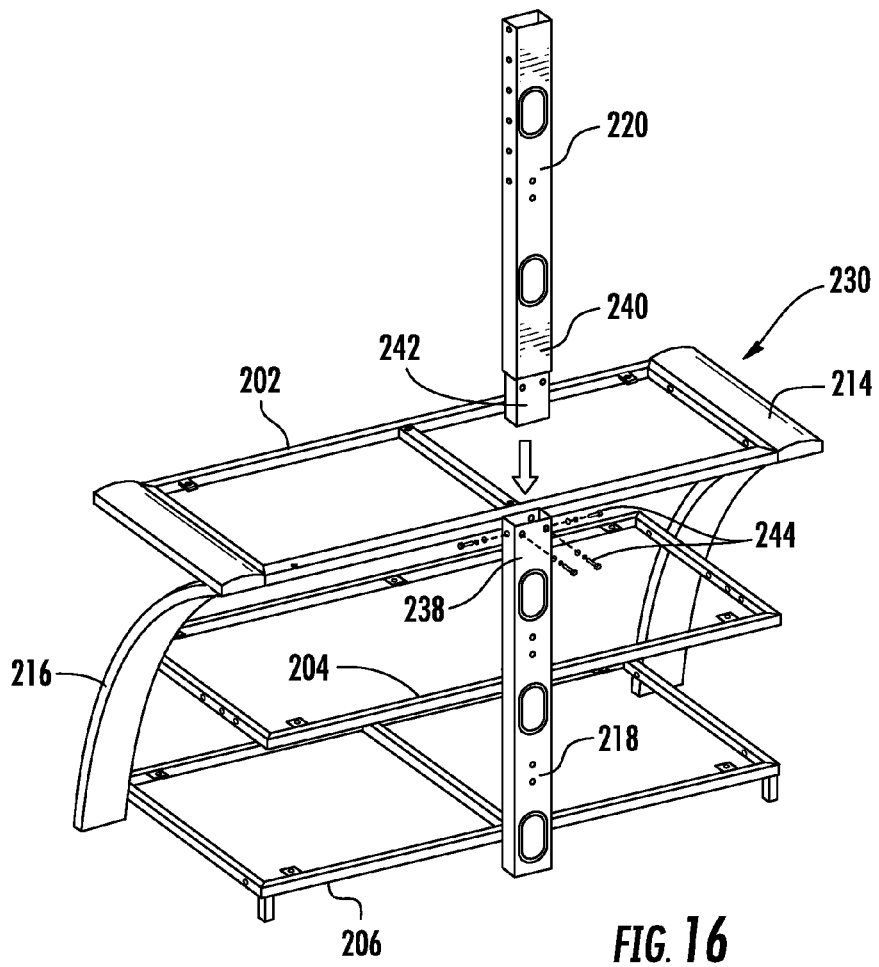
FIG. 16 is a rear perspective view of the console showing attachment of the spine extension to the upper end of the structural spine.

Turning to FIG. 16, the upper spine extension 220 has a lower end 240 which is configured and arranged for attachment to the upper end 238 of the structural spine 218. In the exemplary embodiment, the lower end 240 of the spine extension 220 includes a reduced dimension neck portion 242 which is received within the upper end 238 of the structural spine 220. The spine extension 220 is attached using a plurality of fasteners 244. When attached, the spine extension 220 extends upwardly above the upper surface of the upper shelf 208 terminating in an upper end 246 which provides an elevated support for the flat panel television 201.

Figure 17:
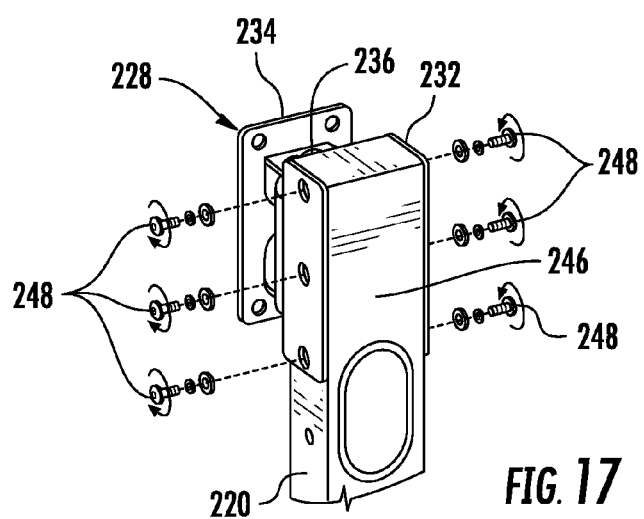
FIG. 17 is an enlarged rear perspective view showing attachment of the pivoting mounting assembly to the upper end of the spine extension.

Turning to FIG. 17, the mounting assembly 228 is attached to the upper end 246 of the spine extension 220 with a plurality of fasteners 248. As indicated above, the mounting assembly 228 includes an offset arm portion 232 which moves the pivot point of the assembly forward from the spine extension 220 to float the panel television 201 above the upper shelf 208.

Figure 18:
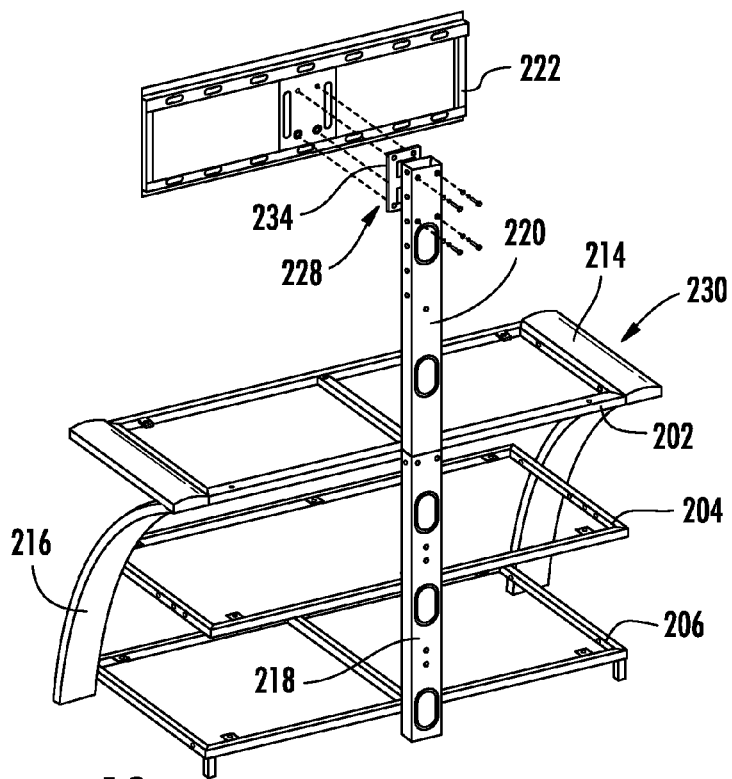
FIG. 18 is a rear perspective view thereof showing attachment of the mounting frame to the mounting assembly.
Figure 19:
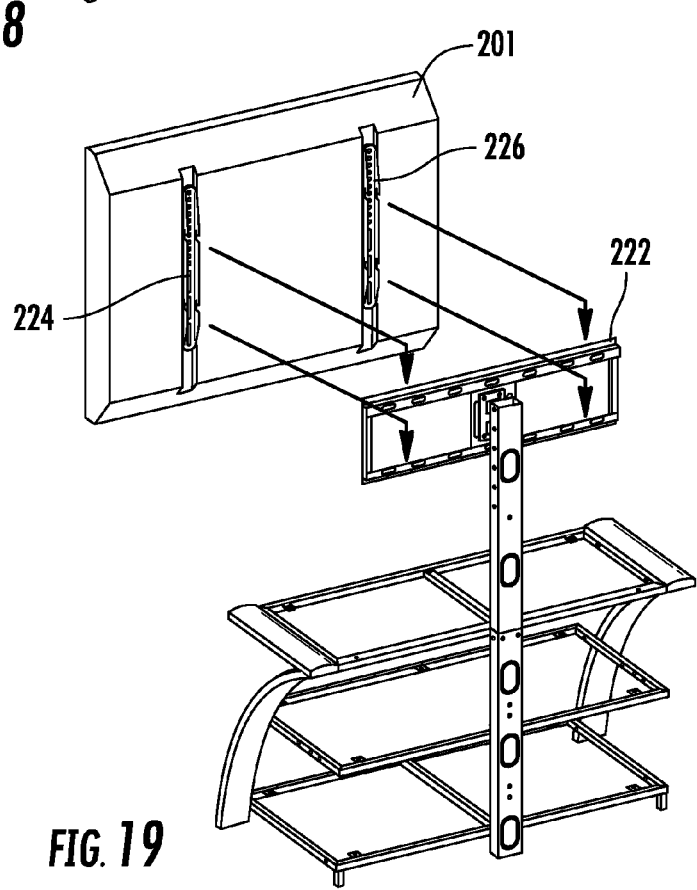
FIG. 19 is a rear perspective view thereof showing attachment of the television to the mounting frame.

Moving on to FIGS. 18 and 19, the back side of the mounting frame 222 is secured to the front side of the mounting plate 234 of the mounting assembly 228 to complete the console configuration. The panel brackets 224, 226 are secured to the rear of the panel television 201 and the hooks of the panel brackets 224, 226 are received over the spaced rails of the mounting frame 222 to complete the third configuration.

To complete the second configuration, the mounting frame 222 is also configured to be attached to a wall (as shown in FIG. 7). The panel brackets 224, 226 are secured to the rear of the panel television 201 and the hooks of the panel brackets 224, 226 are received over the spaced rails of the mounting frame 222 to complete the wall mount configuration.

The invention has been described in conjunction with an exemplary embodiment for clarity and enablement, however the scope of the invention should be limited only by the appended claims.

What is claimed is:

1. A flat panel television console and support kit for use in a plurality of different user defined configurations comprising:
   a flat panel television console having a front side, a back side, an upper shelf and a structural spine secured to said back side thereof, said structural spine having an upper end which terminates adjacent said upper shelf, said structural spine providing a structural support for said upper shelf, said flat panel television console being capable of supporting a flat panel television on an upper surface of said upper shelf;
   a spine extension having a lower end configured and arranged for attachment to said upper end of said structural spine, said spine extension extending above said upper surface of said upper shelf and terminating in an upper end which provides an elevated support for a flat panel television;
   a flat panel television mounting assembly configured and arranged to be attached to said upper end of said spine extension; and
   a flat panel television mounting frame,
   said kit being useful in a first configuration wherein a flat panel television is supported on said upper surface of said upper shelf of said console,
   said kit being useful in a second configuration wherein said console is used in a standalone configuration and said flat panel television is mounted to a wall whereby said flat panel television is secured to said flat panel television mounting frame and said flat panel television mounting frame is secured to said wall,
   said kit being useful in a third configuration wherein said flat panel television is secured to said flat panel television mounting frame, and said flat panel television mounting frame is secured to said flat panel television mounting assembly at said upper end of said spine extension, and said spine extension is attached to said upper end of said structural spine to support said flat panel television above said console.

2. The kit of claim 1 wherein said flat panel television mounting assembly includes an offset arm, said offset arm being useful in said third configuration.

3. The kit of claim 2 wherein said flat panel television mounting assembly includes a pivot mechanism, said pivot mechanism being useful in said third configuration.

4. The kit of claim 1 wherein said flat panel television mounting assembly includes a pivot mechanism, said pivot mechanism being useful in said third configuration.

5. The kit of claim 1 wherein said spine extension includes a reduced dimension neck which is received into said upper end of said structural spine.

6. The kit of claim 5 wherein said mounting frame further includes a pair of panel brackets wherein said panel brackets are secured to a back surface of said flat panel television and said panel brackets are further secured to said flat panel television mounting frame.

7. The kit of claim 1 wherein said mounting frame further includes a pair of panel brackets wherein said panel brackets are secured to a back surface of said flat panel television and said panel brackets are further secured to said flat panel television mounting frame.

8. A flat panel television console and support kit for use in a plurality of different user defined configurations comprising:
   a flat panel television console having a front side, a back side, an upper shelf and a structural spine secured to said back side thereof, said structural spine having an upper end which terminates adjacent said upper shelf, said flat panel television console being capable of supporting a flat panel television on an upper surface of said upper shelf;
   a spine extension having a lower end configured and arranged for attachment to said upper end of said structural spine, said spine extension extending above said upper surface of said upper shelf and terminating in an upper end which provides an elevated support for a flat panel television;
   a flat panel television mounting assembly configured and arranged to be attached to said upper end of said spine extension; and
   a flat panel television mounting frame,
   said kit being useful in a first configuration wherein a flat panel television is supported on said upper surface of said upper shelf of said console,
   said kit being useful in a second configuration wherein said console is used in a standalone configuration and said flat panel television is mounted to a wall whereby said flat panel television is secured to said flat panel television mounting frame and said flat panel television mounting frame is secured to said wall,
   said kit being useful in a third configuration wherein said flat panel television is secured to said flat panel television mounting frame, and said flat panel television mounting frame is secured to said flat panel television mounting assembly at said upper end of said spine extension, and said spine extension is attached to said upper end of said structural spine to support said flat panel television above said console.

9. The kit of claim 8 wherein said flat panel television mounting assembly includes an offset arm, said offset arm being useful in said third configuration.

10. The kit of claim 9 wherein said flat panel television mounting assembly includes a pivot mechanism, said pivot mechanism being useful in said third configuration.

11. The kit of claim 8 wherein said flat panel television mounting assembly includes a pivot mechanism, said pivot mechanism being useful in said third configuration.

12. The kit of claim 8 wherein said spine extension includes a reduced dimension neck which is received into said upper end of said structural spine.

13. The kit of claim 12 wherein said mounting frame further includes a pair of panel brackets wherein said panel brackets are secured to a back surface of said flat panel television and said panel brackets are further secured to said flat panel television mounting frame.

14. The kit of claim 8 wherein said mounting frame further includes a pair of panel brackets wherein said panel brackets are secured to a back surface of said flat panel television and said panel brackets are further secured to said flat panel television mounting frame.

15. A flat panel television console and support kit for use in a plurality of different user defined configurations comprising:
   a flat panel television console having a front side, a back side, and an upper shelf, said flat panel television console being capable of supporting a flat panel television on an upper surface of said upper shelf;

a spine including a lower structural spine portion secured to said back side of said console, said lower structural spine portion having an upper end which terminates adjacent said upper shelf of said console, said spine further including an upper spine extension portion having a lower end configured and arranged for attachment to said upper end of said lower structural spine portion, said upper spine extension portion extending above said upper surface of said upper shelf and terminating in an upper end which provides an elevated support for a flat panel television;

a flat panel television mounting assembly configured and arranged to be attached to said upper end of said spine extension portion; and a flat panel television mounting frame, said kit being useful in a first configuration wherein said lower structural spine portion is attached to said back side of said console and a flat panel television is supported on said upper surface of said upper shelf of said console, said kit being useful in a second configuration wherein said console is used in a standalone configuration with said lower structural spine portion attached to said back side thereof, and said flat panel television is mounted to a wall whereby said flat panel television is secured to said flat panel television mounting frame and said flat panel television mounting frame is secured to said wall, said kit being useful in a third configuration wherein said flat panel television is secured to said flat panel television mounting frame, and said flat panel television mounting frame is secured to said flat panel television mounting assembly at said upper end of said upper spine extension portion, and said upper spine extension portion is attached to said upper end of said lower structural spine portion, and said lower structural spine portion is attached to said back side of said console, said spine supporting said flat panel television above said console.

16. The kit of claim 15 wherein said flat panel television mounting assembly includes an offset arm, said offset arm being useful in said third configuration.

17. The kit of claim 16 wherein said flat panel television mounting assembly includes a pivot mechanism, said pivot mechanism being useful in said third configuration.

18. The kit of claim 15 wherein said flat panel television mounting assembly includes a pivot mechanism, said pivot mechanism being useful in said third configuration.

19. The kit of claim 15 wherein said upper spine extension portion includes a reduced dimension neck which is received into said upper end of said lower structural spine portion.

20. The kit of claim 15 wherein said mounting frame further includes a pair of panel brackets wherein said panel brackets are secured to a back surface of said flat panel television and said panel brackets are further secured to said flat panel television mounting frame.

21. The kit of claim 20 wherein said mounting frame further includes a pair of panel brackets wherein said panel brackets are secured to a back surface of said flat panel television and said panel brackets are further secured to said flat panel television mounting frame.

* * * * *